(12) United States Patent
Stevens et al.

(10) Patent No.: US 11,666,035 B2
(45) Date of Patent: Jun. 6, 2023

(54) ADJUSTABLE REVERSIBLE HARNESS

(71) Applicant: Frenchie Bulldog, LLC, Salt Lake City, UT (US)

(72) Inventors: Austin Stevens, Milwaukee, WI (US); Bridget Daly, Solana Beach, CA (US)

(73) Assignee: Frenchie Bulldog, LLC, Salt Lake City, UT (US)

( * ) Notice: Subject to any disclaimer, the term of this patent is extended or adjusted under 35 U.S.C. 154(b) by 142 days.

(21) Appl. No.: 17/095,875

(22) Filed: Nov. 12, 2020

(65) Prior Publication Data
US 2022/0142124 A1    May 12, 2022

(51) Int. Cl.
*A01K 27/00*    (2006.01)

(52) U.S. Cl.
CPC .................. *A01K 27/002* (2013.01)

(58) Field of Classification Search
CPC .................................................. A01K 27/002
See application file for complete search history.

(56) References Cited

U.S. PATENT DOCUMENTS

| | | |
|---|---|---|
| 1,906,043 A | 4/1933 | Bernstein |
| 2,605,744 A | 8/1952 | Urbanski |
| 4,324,204 A * | 4/1982 | Friedman ............. A01K 1/0272 280/801.1 |
| 5,611,298 A | 3/1997 | Sporn |
| 5,630,382 A | 5/1997 | Barbera et al. |
| 5,738,043 A | 4/1998 | Manuel |
| D621,561 S | 8/2010 | Siklosi et al. |
| D633,257 S | 2/2011 | Trias |
| D638,176 S | 5/2011 | Mugford |
| D652,581 S | 1/2012 | Evans |
| 8,261,699 B2 | 9/2012 | Cho |
| D677,841 S | 3/2013 | Gibbs |
| D681,287 S | 4/2013 | Collignon |
| D701,007 S | 3/2014 | Krupich |
| D713,996 S | 9/2014 | Collett |

(Continued)

FOREIGN PATENT DOCUMENTS

| | | |
|---|---|---|
| DE | 202017103155 U1 * | 7/2017 |
| DE | 202018001887 U1 * | 8/2018 |

(Continued)

OTHER PUBLICATIONS

International Search Report and Written Opinion in International Application No. PCT/US2021/072367, dated Feb. 9, 2022.

*Primary Examiner* — Magdalena Topolski
*Assistant Examiner* — Alanna K Peterson
(74) *Attorney, Agent, or Firm* — Kim IP Law Group LLC

(57) ABSTRACT

A reversible harness for an animal having a neck region and a waist region. The harness includes a chest piece, and a back piece having a back-side tethering strap. A leash connector is rotatably disposed on the tethering strap. The reversible harness further includes a first adjustable strap to secure the chest piece to the back piece about the neck region of the animal, and a second adjustable strap to secure the chest piece to the back piece about the waist region of the animal. The harness is adapted to fit a wide variety of sizes of animals. Additionally, owing to at least one top fabric portion and at the least one bottom fabric portion of the back piece, and a first chest-side fabric portion and a second chest-side fabric portion of the chest piece, the harness is reversible.

2 Claims, 8 Drawing Sheets

(56) References Cited

U.S. PATENT DOCUMENTS

| | | | |
|---|---|---|---|
| D753,350 S | 4/2016 | Thitz et al. | |
| D776,287 S | 1/2017 | Leonard | |
| D791,991 S | 7/2017 | Brauser et al. | |
| D805,261 S | 12/2017 | Yun | |
| D823,556 S | 7/2018 | Yun | |
| D883,581 S | 5/2020 | Daly et al. | |
| D914,301 S * | 3/2021 | Xu | D30/152 |
| 11,102,958 B1 * | 8/2021 | Chang | A01K 27/002 |
| D936,914 S * | 11/2021 | Deng | D30/152 |
| 2008/0134991 A1 | 6/2008 | Depass | |
| 2008/0223311 A1 | 9/2008 | Ito | |
| 2010/0263602 A1 | 10/2010 | Cho | |
| 2011/0271913 A1 | 11/2011 | Min | |
| 2013/0014705 A1 | 1/2013 | Cho et al. | |
| 2013/0128556 A1 | 5/2013 | Brauser et al. | |
| 2017/0215386 A1 * | 8/2017 | Pianelli | A01K 27/002 |
| 2017/0265437 A1 * | 9/2017 | Sporn | A01K 27/002 |
| 2019/0124890 A1 * | 5/2019 | Kath | A01K 1/0263 |
| 2019/0364847 A1 * | 12/2019 | Mills | A01K 27/002 |
| 2019/0373860 A1 | 12/2019 | Kath | |
| 2020/0305394 A1 | 1/2020 | Stouder et al. | |

FOREIGN PATENT DOCUMENTS

| | | | | |
|---|---|---|---|---|
| SE | WO9829281 A1 | 7/1998 | | |
| WO | WO9202128 A1 | 2/1992 | | |
| WO | WO-2019089881 A1 * | 5/2019 | | A01K 27/002 |

* cited by examiner

ADJUSTABLE REVERSIBLE HARNESS

BACKGROUND OF THE DISCLOSURE

The exemplary embodiments of present invention relate generally to animal harnesses and, more specifically, to an adjustable and reversible animal harness suitable for use with animals including, without limitation, dogs.

A typical animal harness comes in a size suitable to fit a particular size of animal. Reversible animal harnesses (i.e., harnesses that allow either side of panel portions thereof to be positioned against an animal) are also known, but are generally provided in a single size to accommodate a specific size of animal or range of sizes. There is a need in the art for a reversible harness that may be adjusted to accommodate different sized animals.

BRIEF SUMMARY OF THE DISCLOSURE

In accordance with an exemplary embodiment there is provided a reversible harness for an animal having a neck region and a waist region. The harness comprises a chest piece, and a back piece having a back-side tethering strap. A leash connector is rotatably disposed on the tethering strap. The reversible harness further comprises a first adjustable strap to secure the chest piece to the back piece about the neck region of the animal, and a second adjustable strap to secure the chest piece to the back piece about the waist region of the animal.

According to an aspect, the leash connector includes a ring.

According to another aspect, the back-side tethering strap includes a proximal end having a first loop and a distal end having a second loop, and the first adjustable strap extends through the first loop and the second adjustable strap extends through the second loop.

According to another aspect, the back piece includes at least one top fabric portion and at least one bottom fabric portion. According to another aspect, the back-side tethering strap is positioned between the top fabric portion and the bottom fabric portion. According to another aspect, the top fabric portion includes a top opening and the bottom fabric portion includes a bottom opening, the leash connector being selectively positionable to extend through either the top opening or the bottom opening. According to another aspect, the at least one top fabric portion includes two top fabric portions and the at least one bottom fabric portion includes two bottom fabric portions, and the top opening is formed between the two top fabric portions and the bottom opening is formed between the two bottom fabric portions.

According to another aspect, the top fabric portion and the bottom fabric portion form a first back-side channel and a second back-side channel, and the first adjustable strap extends through the first back-side channel and the second adjustable strap extends through the second back-side channel. According to another aspect, the tethering strap includes a proximal end having a first loop positioned within the first back-side channel and a distal end having a second loop positioned within the second back-side channel, and the first adjustable strap extends through the first loop and the second adjustable strap extends through the second loop.

According to another aspect, the chest piece includes a first chest-side fabric portion and a second chest-side fabric portion. According to another aspect, the chest piece includes a chest-side tethering strap positioned between the first and second chest-side fabric portions. According to another aspect, the chest-side tethering strap includes a proximal end having a third loop and a distal end having a fourth loop, and the first adjustable strap extends through the third loop and the second adjustable strap extends through the fourth loop. According to another aspect, the first and second chest-side fabric portions form a first chest-side channel and a second chest-side channel, and the first adjustable strap extends through the first chest-side channel and the second adjustable strap extends through the second chest-side channel.

According to another aspect, the first adjustable strap includes a first adjusting slide to adjust a length of the first adjustable strap. According to another aspect, the second adjustable strap includes a second adjusting slide to adjust a length of the second adjustable strap.

According to another aspect, the chest piece and the back piece are substantially H-shaped.

In accordance with another exemplary embodiment there is provided a method of securing the above-described reversible harness to an animal. The method comprises the steps of positioning the back piece in contact with a back region of the animal, positioning the chest piece in contact with a chest region of the animal, adjusting a length of the first adjustable strap to accommodate a neck region of the animal, and adjusting a length of the second adjustable strap to accommodate a waist region of the animal. According to an aspect, the method further comprises the step of affixing a leash to the leash connector.

As a result of the first and second adjustable straps, the harness is adapted to fit a wide variety of sizes of animals. Additionally, owing to the at least one top fabric portion and at least one bottom fabric portion of the back piece, and the first chest-side fabric portion and a second chest-side fabric portion of the chest piece, the harness is reversible.

Other features and advantages of the subject disclosure will be apparent from the following more detailed description of the exemplary embodiments.

BRIEF DESCRIPTION OF THE SEVERAL VIEWS OF THE DRAWINGS

The foregoing summary, as well as the following detailed description of the exemplary embodiments of the subject disclosure, will be better understood when read in conjunction with the appended drawings. For the purpose of illustrating the present disclosure, there are shown in the drawings exemplary embodiments. It should be understood, however, that the subject application is not limited to the precise arrangements and instrumentalities shown.

DETAILED DESCRIPTION OF THE DISCLOSURE

Figure 1:
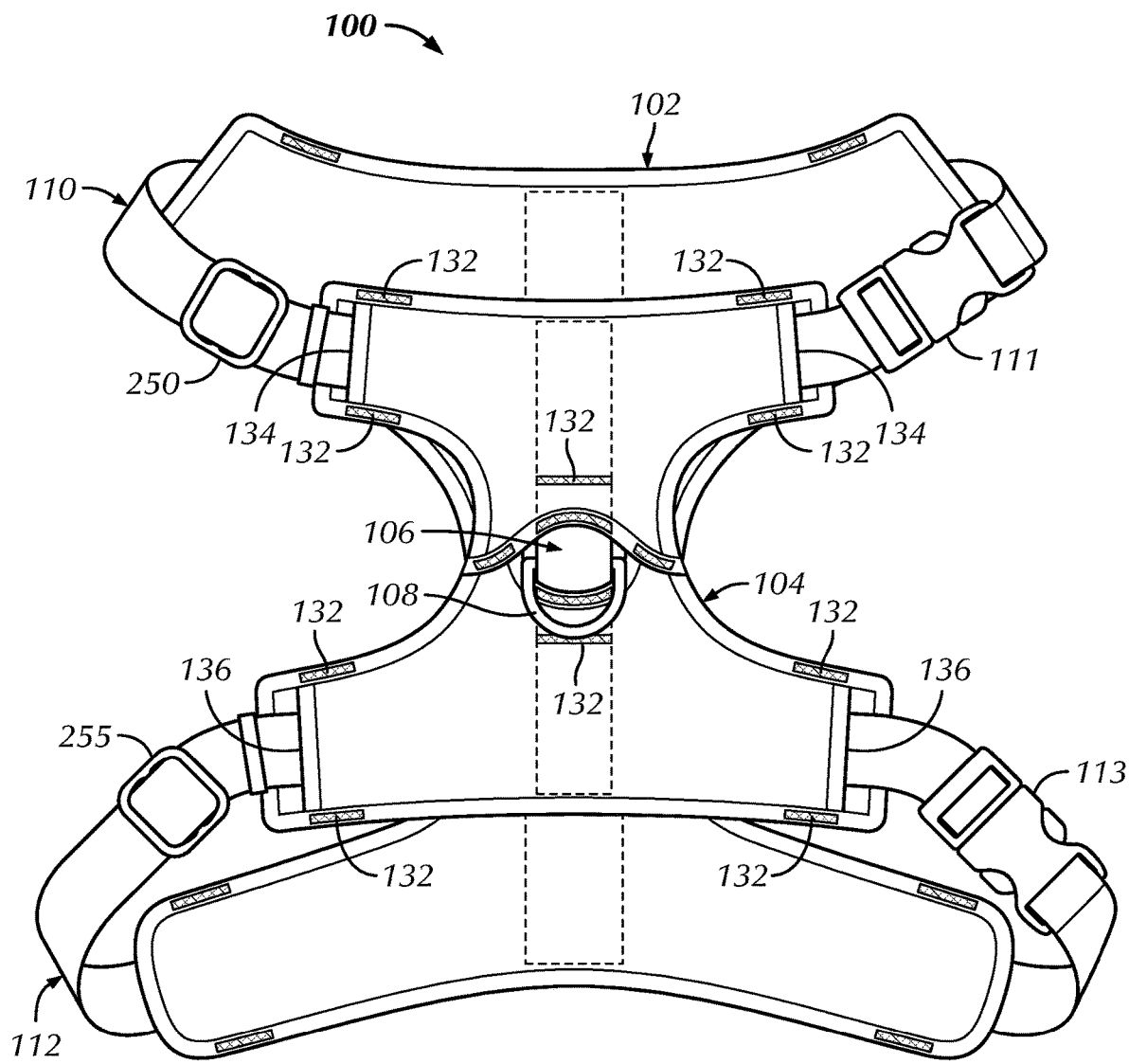
FIG. 1 is a top view of a reversible harness in accordance with an exemplary embodiment of the subject disclosure.
Figure 2:
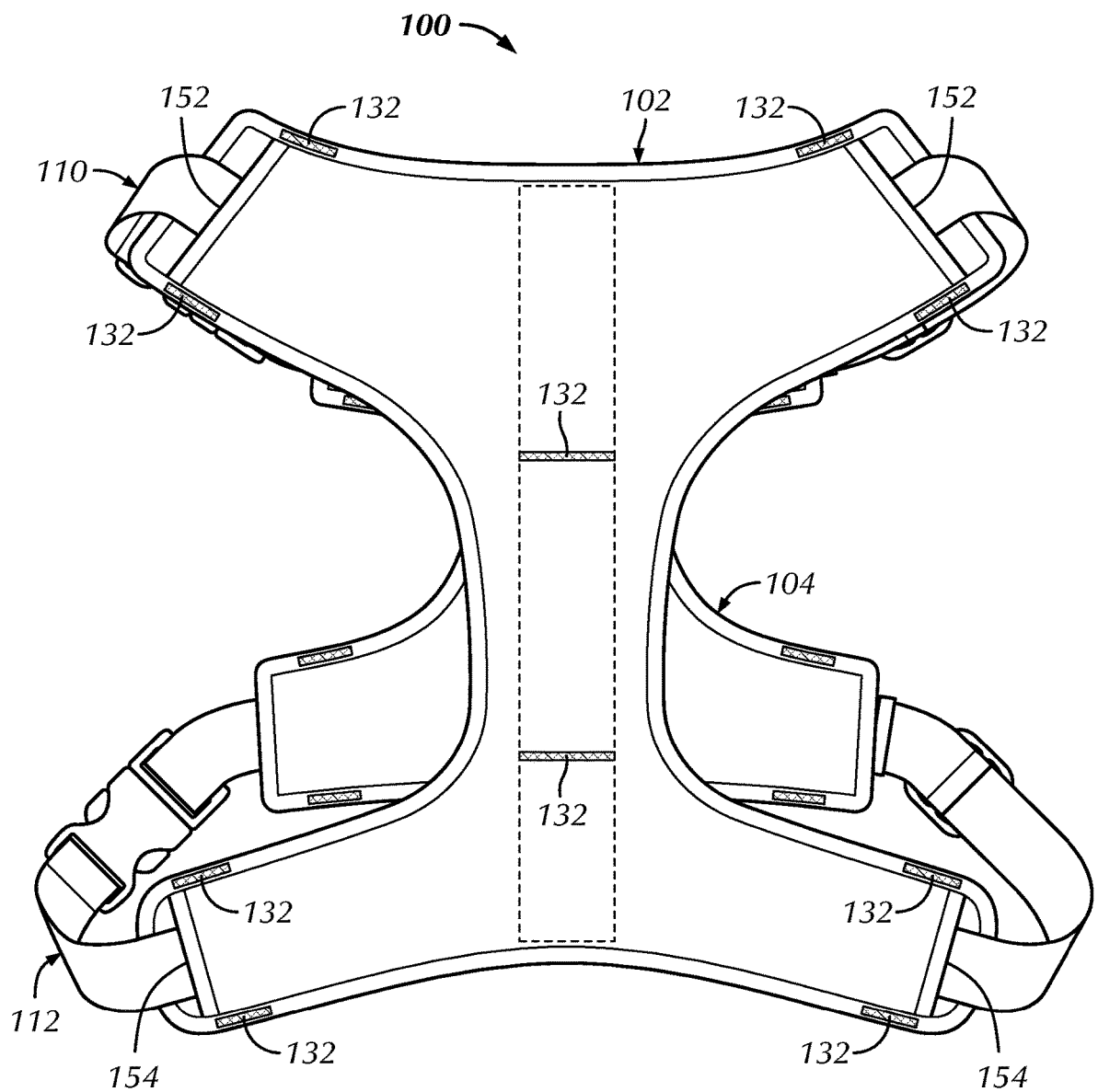
FIG. 2 is a bottom view of the reversible harness of FIG. 1.
Figure 3:
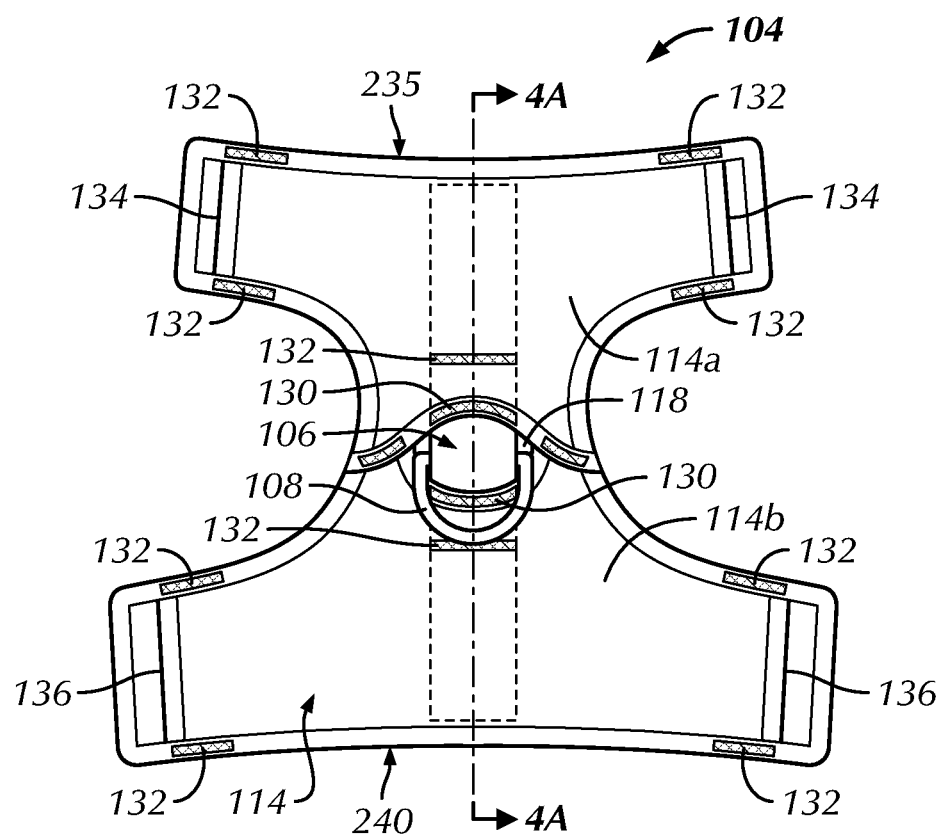
FIG. 3 is a top view of a back piece of the reversible harness of FIG. 1 showing a top fabric portion thereof.
Figure 4A:
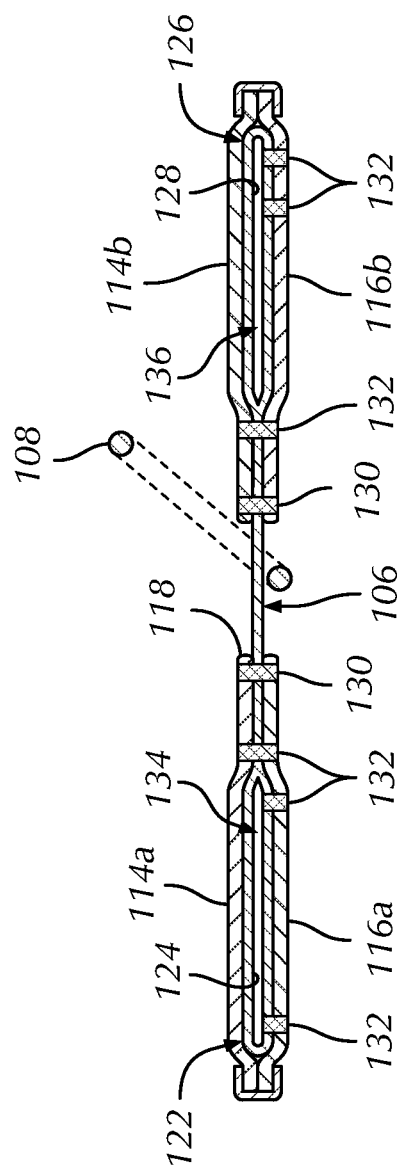
FIG. 4A is longitudinal-sectional view of the back piece of FIG. 3 taken along line 4A-4A of FIG. 3.
Figure 4B:
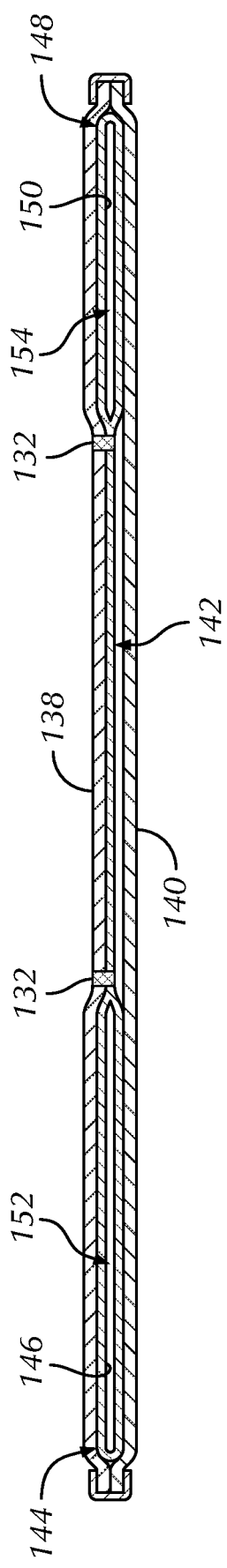
FIG. 4B is longitudinal-sectional view of the chest piece of FIG. 5 taken along line 4B-4B of FIG. 5.
Figure 5:
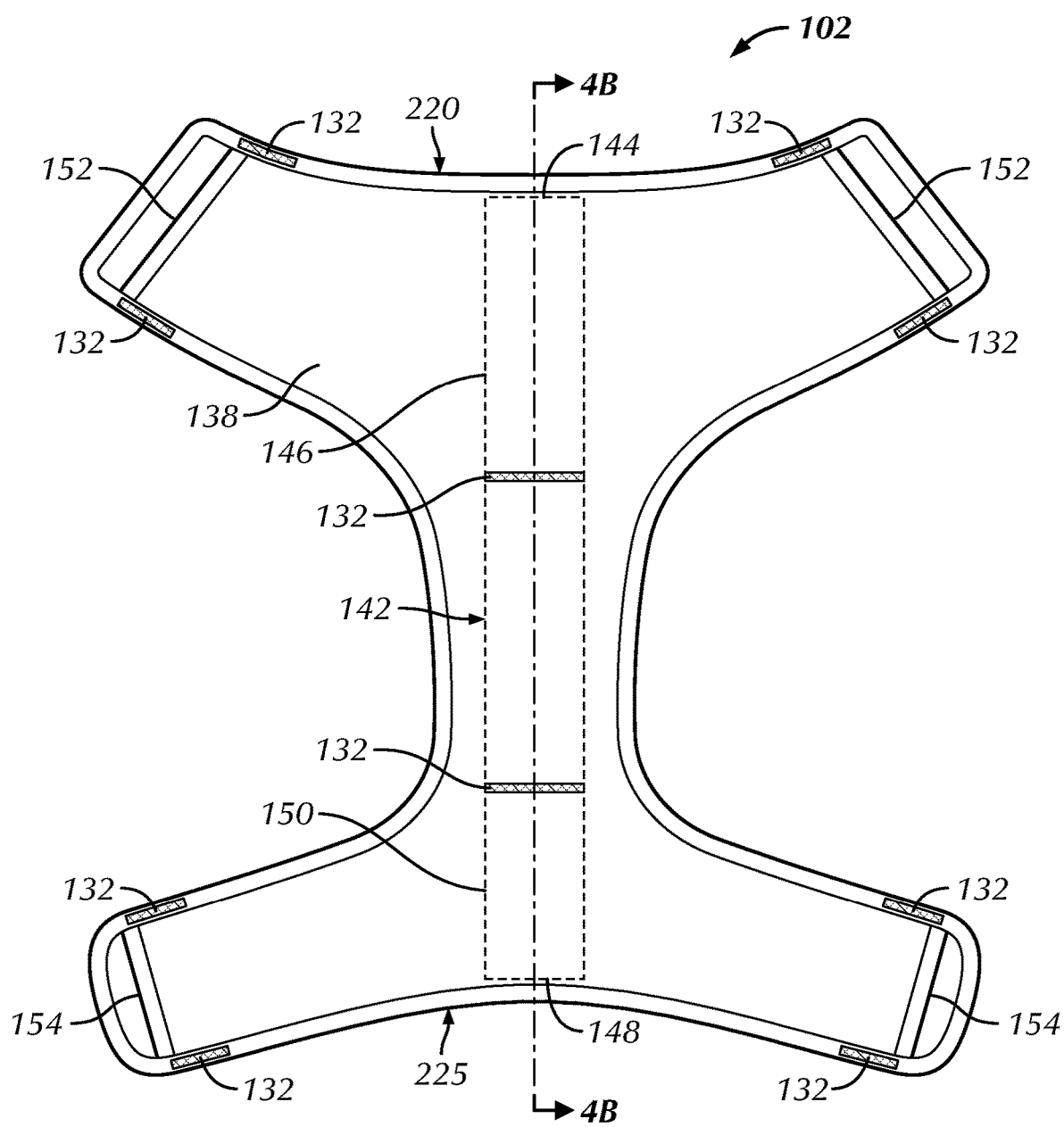
FIG. 5 is bottom view of a chest piece of the reversible harness of FIG. 1 showing a top fabric portion thereof.
Figure 6:
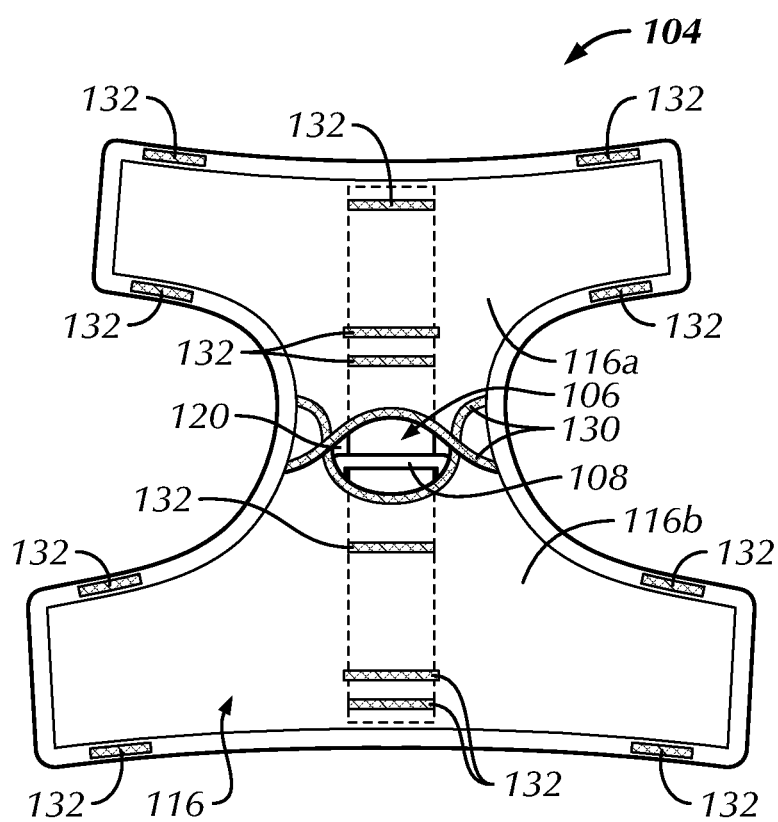
FIG. 6 is a bottom view of the back piece of the reversible harness of FIG. 1 showing a bottom fabric portion thereof.
Figure 7:
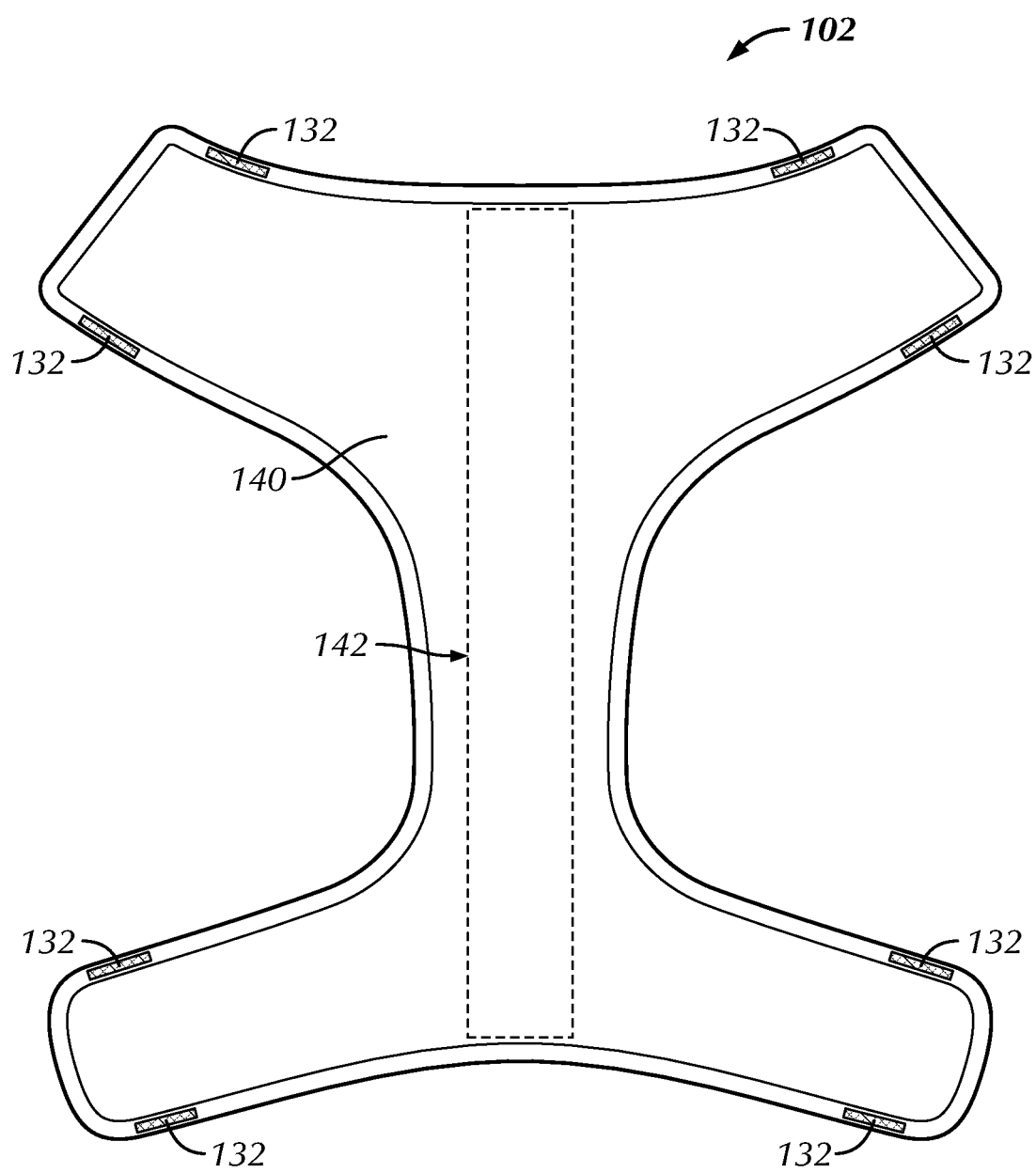
FIG. 7 is a bottom view of the chest piece of the reversible harness of FIG. 1 showing a bottom fabric portion thereof.

Reference will now be made in detail to the various exemplary embodiments of the subject disclosure illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Directional terms such as top, bottom, left, right, above, below and diagonal, are used with respect to the accompanying drawings. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

"About" as used herein when referring to a measurable value such as an amount, a temporal duration, and the like, is meant to encompass variations of ±20%, ±10%, +5%, +1%, or +0.1% from the specified value, as such variations are appropriate.

"Substantially" as used herein shall mean considerable in extent, largely but not wholly that which is specified, or an appropriate variation therefrom as is acceptable within the field of art.

"Exemplary" as used herein shall mean serving as an example.

Throughout the subject application, various aspects thereof can be presented in a range format. It should be understood that the description in range format is merely for convenience and brevity and should not be construed as an inflexible limitation on the scope of the subject disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments of the subject disclosure may be combined in any suitable manner in one or more embodiments. One skilled in the relevant art will recognize, in light of the description herein, that the subject disclosure can be practiced without one or more of the specific features or advantages of a particular exemplary embodiment. In other instances, additional features and advantages may be recognized in certain embodiments that may not be present in all exemplary embodiments of the present disclosure.

Figure 9:
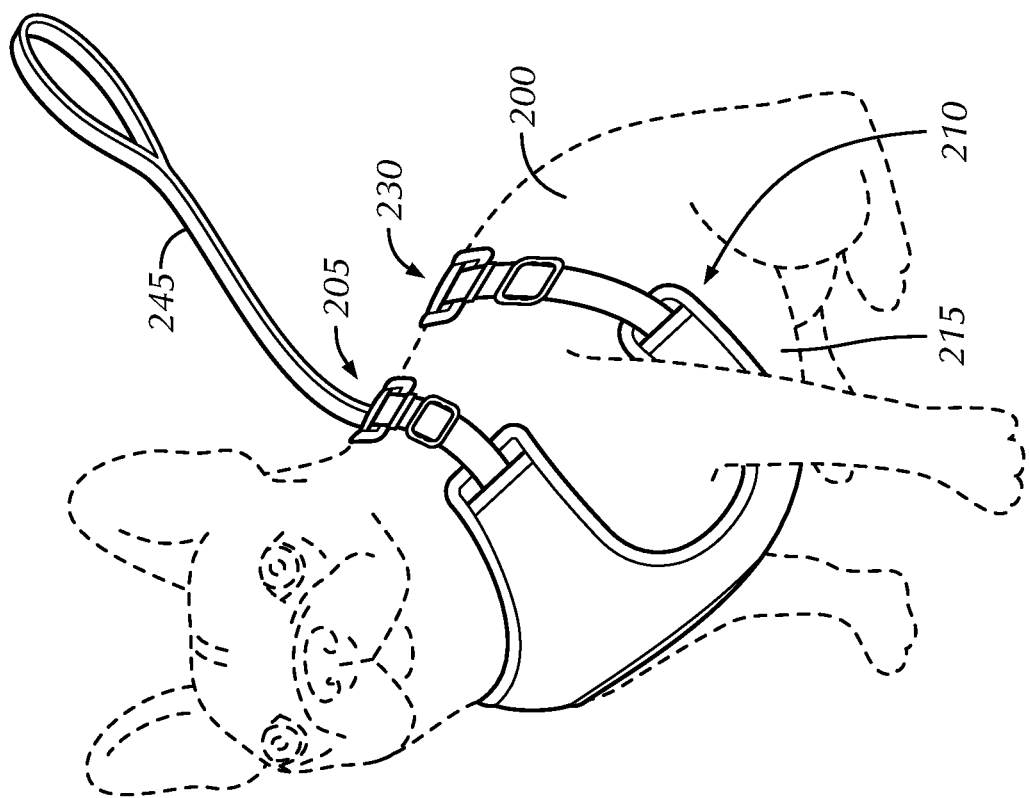
FIG. 9 is a left-side perspective view of the reversible harness of FIG. 1 on an animal.
Figure 8:
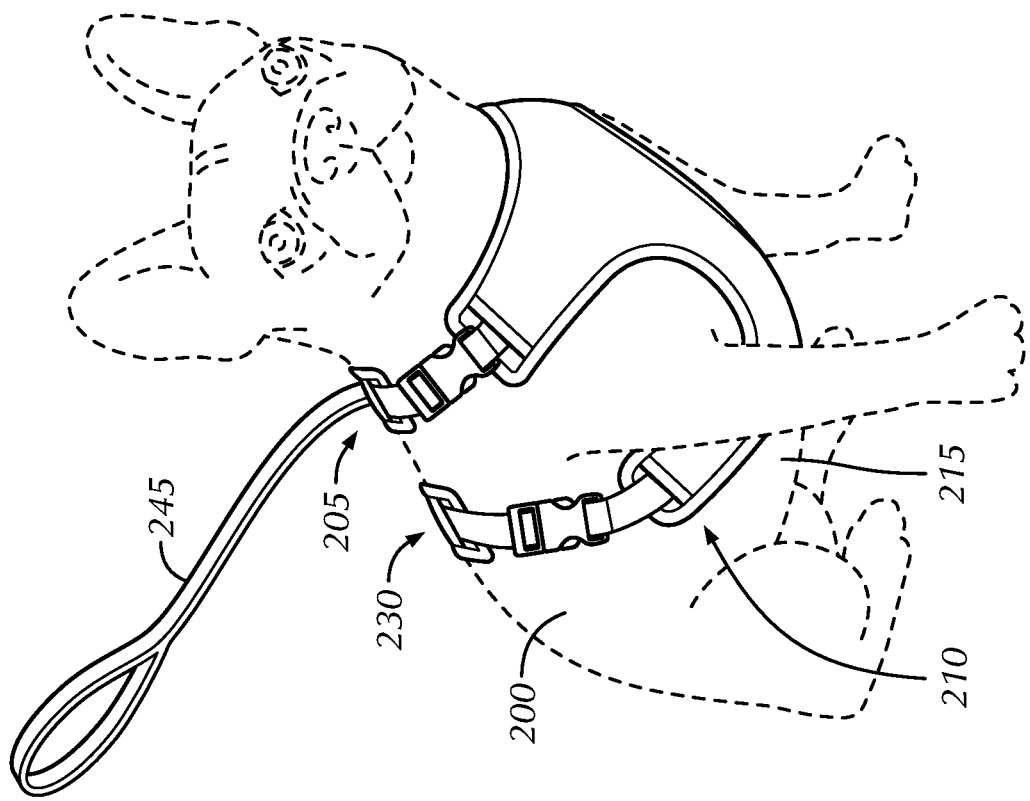
FIG. 8 is a right-side perspective view of the reversible harness of FIG. 1 on an animal.

Referring now to the drawings, there is seen a reversible harness 100 in accordance with an exemplary embodiment of the subject disclosure for use with an animal 200 having a neck region 205 and a waist region 210 (see FIGS. 8 and 9). Reversible harness 100 includes a chest piece 102; a back piece 104 having a back-side tethering strap 106; a leash connector 108 rotatably disposed on the tethering strap 106 for connecting to a leash 245; a first adjustable strap 110 to secure chest piece 102 and back piece 104 about neck region 205 of animal 200; and a second adjustable strap 112 to secure chest piece 102 and back piece 104 about waist region 210 of the animal 200.

As best shown in FIGS. 1, 3, 4A, 6, 8 and 9, back piece 104 is sized and shaped to accommodate and mate with back 230 of animal 200, though it should be appreciated that back piece 104 may be sized to accommodate a range of back sizes of different animals. It should also be appreciated that back piece 104 may assume a particular shape suitable for promoting comfort of animal 200, such as the H-shape shown in the Figures, though various embodiments of the subject disclosure are not intended to be limited to any particular shape.

Back piece 104 may be constructed from any suitable material, such as a breathable fabric, including without limitation, elastomeric fabric, such as neoprene, soft poly fabric, mesh fabric, any combination of the foregoing, etc. In the embodiment shown in the Figures, back piece 104 is constructed from four fabric portions, including two top fabric portions 114a, 114b and two bottom fabric portions 116a, 116b, connected together via stitching 132 (or other suitable connecting structure) to form top and bottom openings 118, 120 and first and second back-side channels 134, 136 for respectively accommodating first and second adjustable straps 110, 112. It should be appreciated, however, that back piece 104 may be constructed from any number of different fabric portions and that various embodiments of the subject disclosure are not intended to be limited to any specific number or configuration of fabric portions. Since harness 100 is reversible, it should also be appreciated that different artistic prints and/or designs may be provided on either or both sides of back piece 104.

Back piece 104 also includes a back-side tethering strap 106 positioned between top and bottom fabric portions 114a, 114b, 116a, 116b. Back-side tethering strap 106 includes proximal and distal ends 122, 126 having respective first and second loops 124, 128 positioned within first and second back-side channels 134, 136 for respectively and slidably receiving first and second adjustable straps 110, 112. Loops 124, 128 protect back piece 104 and improve comfort for animal 200 by properly positioning and preventing adjustable straps 110, 112 from placing pressure against proximal and distal boundaries 235, 240 of back piece 104 where top and bottom fabric portions 114a, 114b, 116a, 116b are stitched together.

Leash connector 108 is rotatably positioned on back-side tethering strap 106. Leash connector 108 is also selectively extendable through either of top and bottom openings 118, 120 for connecting to leash 245. The leash connector is prevented from sliding proximally or distally on back-side tethering strap 106 by stitched boundaries 130 of fabric portions 114a, 114b, 116a, 116b. In this manner, either side of back piece 104 may be positioned against back 230 of animal 200, thereby enabling the reversibility of harness 100 in a manner more fully described below. Although leash connector 108 of the embodiment shown in the Figures is a D-ring, it should be appreciated that leash connector 108 may include other structures suitable for attaching harness 100 to leash 245 (such as a rounded ring, clip, fastener, etc.), and that various embodiments of the subject disclosure are not intended to be limited to any particular structure(s) for doing so.

As best shown in FIGS. 2, 4B, 5 and 7 through 9, chest piece 102 is sized and shaped to accommodate and mate with chest 215 of animal 200, though it should be appreciated that chest piece 102 may be sized to accommodate a range of chest sizes of different animals. It should also be appreciated that chest piece 102 may assume a particular shape suitable for promoting comfort of animal 200, such as the H-shape shown in the Figures, though various embodiments of the subject disclosure are not intended to be limited to any particular shape.

Chest piece 102 may be constructed from any suitable material, such as a breathable fabric, including without limitation, elastomeric fabric, such as neoprene, soft poly fabric, mesh fabric, any combination of the foregoing, etc. In the embodiment shown in the Figures, chest piece 102 is constructed from first and second chest-side fabric portions 138, 140 connected together via stitching 132 (or other suitable connecting structure) to form a first chest-side channel 152 and a second chest-side channel 154 for respectively accommodating first and second adjustable straps 110, 112, though it should be appreciated that chest piece 102 may be constructed from any number of different fabric portions and that various embodiments of the subject disclosure are not intended to be limited to any specific number or configuration of fabric portions. Since harness 100 is reversible, it should also be appreciated that different artistic prints and/or designs may be provided on either or both sides of chest piece 102.

Chest piece 102 also includes a chest-side tethering strap 142 positioned between first and second chest-side fabric portions 138, 140. Chest-side tethering strap 142 includes proximal and distal ends 144, 148 having respective third and fourth loops 146, 150 positioned within first and second chest-side channels 152, 154 for respectively and slidably receiving first and second adjustable straps 110, 112. Loops 146, 150 protect chest piece 102 and improve comfort for animal 200 by properly positioning and preventing adjustable straps 110, 112 from placing pressure against proximal and distal boundaries 220, 225 of chest piece 102 where first and second chest-side fabric portions 138, 140 are stitched together.

First and second adjustable straps 110, 112 are respectively and slidably positioned within first back-side and first chest-side channels 134, 152 and second back-side and second chest-side channels 136, 154, as well as through loops 124, 128, 146, 150 positioned within these channels. First and second adjustable straps 110, 112 may be constructed from any suitable material, such as fabric, and be of any length suitable to accommodate neck and waist regions 205, 210 of animal 200. In the embodiment depicted in the Figures, first and second adjustable straps 110, 112 are provided with respective buckles 111, 113 for securing straps 110, 112 and adjusting slides 250, 255 for adjusting the lengths thereof to fit animal 200 (or other animal), though it should be appreciated that other structures may be provided in lieu of or in addition to buckles 111, 113 and slides 250, 255 for securing and adjusting the lengths of straps 110, 112, and that various embodiments of the subject disclosure are not intended to be limited to any particular structure(s) or mechanism(s) for doing so.

To attach reversible harness 100 to animal 200, a user first extends leash connector through either top or bottom openings 118, 120. The user then positions the opposite side of back piece 104 against back 230 of animal 200. Chest piece 102 is then positioned against chest 215 of animal 200, after which buckles 111, 113 are secured and slides 250, 255 are adjusted to accommodate first and second adjustable straps 110, 112 to neck and waist regions 205, 210 of animal 200. Lastly, leash 245 is affixed to leash connector 108.

To reverse harness 100, a user first removes leash 245 from leash connector 108, releases buckles 111, 113 and removes harness 100 from animal 200. The user then twists first and second adjustable straps 110, 112 180 degrees within the channels 134, 136, 152 and 154. Thereafter, the user extends leash connector through the other of top or bottom openings 118, 120 and places the opposite side of back piece 104 against back 230 of animal 200. The opposite side of chest piece 102 is then positioned against chest 215 of animal 200, after which buckles 111, 113 are re-secured and slides 250, 255 are re-adjusted (if necessary) to accommodate first and second adjustable straps 110, 112 to neck and waist regions 205, 210 of animal 200. Lastly, leash 245 is re-affixed to leash connector 108.

It will be appreciated by those skilled in the art that changes could be made to the exemplary embodiments described above without departing from the broad inventive concept thereof. It is to be understood, therefore, that this disclosure is not limited to the particular embodiments disclosed, but it is intended to cover modifications within the spirit and scope of the subject disclosure as defined by the appended claims.

We claim:

1. A reversible harness for an animal having a neck region and a waist region, the harness comprising:
    a chest piece;
    a back piece having a back-side tethering strap;
    a leash connector rotatably disposed on the tethering strap;
    a first adjustable strap to secure the chest piece to the back piece about the neck region of the animal; and
    a second adjustable strap to secure the chest piece to the back piece about the waist region of the animal,
    wherein the back piece includes at least one top fabric portion and at least one bottom fabric portion,
    wherein the back-side tethering strap is positioned between the top fabric portion and the bottom fabric portion,
    wherein the top fabric portion includes a top opening and the bottom fabric portion includes a bottom opening, the leash connector being selectively positionable to extend through either the top opening or the bottom opening.

2. The harness of claim 1, wherein the at least one top fabric portion includes two top fabric portions and the at least one bottom fabric portion includes two bottom fabric portions, and the top opening is formed between the two top fabric portions and the bottom opening is formed between the two bottom fabric portions.

* * * * *